(12) United States Patent
Pliska

(10) Patent No.: US 9,534,966 B2
(45) Date of Patent: Jan. 3, 2017

(54) FLUID LINE TEMPERATURE SENSING

(75) Inventor: Michael James Pliska, Happy Valley, OR (US)

(73) Assignee: ISSPRO, INC., Portland, OR (US)

(*) Notice: Subject to any disclaimer, the term of this patent is extended or adjusted under 35 U.S.C. 154(b) by 0 days.

(21) Appl. No.: 13/541,241

(22) Filed: Jul. 3, 2012

(65) Prior Publication Data
US 2013/0107907 A1 May 2, 2013

Related U.S. Application Data

(60) Provisional application No. 61/553,973, filed on Nov. 1, 2011.

(51) Int. Cl.
G01K 1/14 (2006.01)
G01K 13/02 (2006.01)

(52) U.S. Cl.
CPC ............ G01K 13/02 (2013.01); G01K 1/143 (2013.01); G01K 2013/026 (2013.01); G01K 2205/00 (2013.01)

(58) Field of Classification Search
USPC .................................................. 374/147, 208
See application file for complete search history.

(56) References Cited

U.S. PATENT DOCUMENTS

| 6,550,962 | B1 * | 4/2003 | Yang | F16L 3/04 24/458 |
| 2005/0092460 | A1 * | 5/2005 | Darby | F01P 11/0276 165/11.1 |
| 2009/0190630 | A1 * | 7/2009 | Hong et al. | 374/208 |

OTHER PUBLICATIONS

DieselManor Transcender online product ordering screen, website www.dieselmanor.com/dm_products/DM-TRS.asp visited on Oct. 30, 2011, one-page.
US Sensor Clip on Thermistor product information, website www.digikey.com/us/EN/ph/ussensor/clipon.html visited on Nov. 13, 2011, one page.

* cited by examiner

Primary Examiner — Mirellys Jagan
(74) Attorney, Agent, or Firm — J. Douglas Wells

(57) ABSTRACT

A method of measuring temperature of a fluid using a direct fluid contact temperature sensor by capturing a cooling line between a radius of a clip portion, the clip portion extending longitudinally in parallel with a corresponding portion of the cooling line, and a tip end of the sensor; directly contacting said tip end of said sensor with said cooling line; and measuring temperature of with the sensor. A device is provided for rapidly installing a fluid temperature sensor onto a fluid line for measuring the temperature of the fluid without requiring cutting or disconnection of the fluid line.

13 Claims, 4 Drawing Sheets

FLUID LINE TEMPERATURE SENSING

CROSS-REFERENCE TO RELATED APPLICATIONSS

This application claims the benefit of U.S. provisional patent application Ser. No. 61/553,973, filed Nov. 1, 2011.

BACKGROUND OF THE INVENTION

This disclosure relates generally to fluid line temperature sensing and attachments therefor, and, more particularly, to methods and devices for rapidly installing a fluid temperature sensor onto a fluid line, such as an automotive transmission oil cooling line, for measuring the temperature of the fluid without requiring cutting or disconnection of the fluid line.

With automotive vehicles modified for high performance or used for towing, it is common and desirable to measure transmission oil temperature. Some models of automatic transmission include a test port where an automotive fluid temperature sensor may be installed, but the sensor restricts the flow of fluid possibly leading to transmission problems. Further, the sensor may be a possible leak point, and many new transmission models do not have any test ports. Alternatives include placing the sensor in the transmission oil pan, but this requires removal of the pan and drilling, and, again, leaves a possible leak point. Some kits are available to add a "tee" fitting to the transmission cooler line, but these are expensive and require significant effort to install. An alternative was released in approximately 2009, known as the "Transcender" and is described at the website http://www.dieselmanor.com/dm_products/DM-TRS.asp and illustrated as assembly 100 in FIG. 1. This unit 112 simply clamps onto the metallic portion of the transmission cooler line 102.

As described at the aforementioned website, the Diesel-Manor Transcender™ Temperature Adapter 112 was developed to allow for accurate reading of automotive transmission fluid temperature without the hassle of tapping into the cooler line 102. DieselManor claims it takes merely a few minutes to install, simply attaching to the cooler line 102 with a supplied hose clamp 104, 106, 108, with the sender (automotive fluid temperature sensor) 118 installable without Teflon tape or other thread sealants.

The assembly 100 illustrated in FIG. 1 includes an adapter body 112 having a cutout 110 shaped to receive the cooling line 102. The hose clamp strap 106 is then placed around the adapter body 112 and cooling line 102, fed through the hose clamp screw tightener 104, and tightened with the excess strap 108 extending as illustrated. A cylindrical cavity substantially in parallel alignment with the tubular cutout 110 then receives the sender end (which is typically shaped like the sender probe/shaft 216 shown in FIG. 2). The sender is threaded into the adapter using the hex nut 116. The electrical wires 120 are then routed and secured appropriately.

The Transcender™ assembly 100 works by monitoring the radiated heat in the cooler line 102. DieselManor claims tests have shown that the Transcender™ assembly 100 reads approximately 5 degrees cooler at 200° F., compared to monitoring the fluid temperature with the sender 118 in the cooler line 102.

DieselManor advertises that because the Transcender™ merely attaches to the OEM cooler line 102, it will not void the OEM factory warranty. DieselManor recommends using anti-seize lube inside the threaded portion of the Transcender™ (i.e. where the sender sensor end (not shown) and sender threads 114 are inserted into the adapter body 112) to help conduct the heat from the metallic exterior of the cooler line 102 through the adapter body material 112 to the sender. DieselManor recommends an adapter for ½" cooler lines with ⅛"NPT sender port for most Dodge Cummins automatics, including the 6.7L—Part #: DM-TRS50, Price $29.85—and an adapter for ⅝" cooler lines with ⅛"NPT sender port for most Chevy/GM Duramax automatics—Part #: DM-TRS625 Price $29.85.

What is needed are additional alternative methods and devices for rapidly installing a fluid temperature sensor onto a fluid line for measuring the temperature of the fluid without requiring cutting or disconnection of the fluid line.

BRIEF DESCRIPTION OF THE SEVERAL DRAWINGS

For a more complete understanding of the present invention, the drawings herein illustrate examples of the invention. The drawings, however, do not limit the scope of the invention. Similar references in the drawings indicate similar elements.

FIG. 1 illustrates an existing temperature sender assembly 100 that includes an adapter 112 for attaching an automotive transmission oil temperature sensor/sender 118 to a portion of an automotive transmission cooling line 102.

FIG. 2 is a partial sectional view of an automotive fluid temperature sensor/sender 212 in a split view 200, one half showing a typical direct fluid contact installation 202 and the other half showing a direct cooling line contact installation 204 using a sensor clip 226, according to various embodiments.

DETAILED DESCRIPTION OF PREFERRED EMBODIMENTS

In the following detailed description, numerous specific details are set forth in order to provide a thorough understanding of the preferred embodiments. However, those skilled in the art will understand that the present invention may be practiced without these specific details, that the present invention is not limited to the depicted embodiments, and that the present invention may be practiced in a variety of alternate embodiments. In other instances, well known methods, procedures, components, and systems have not been described in detail.

Figure 1:
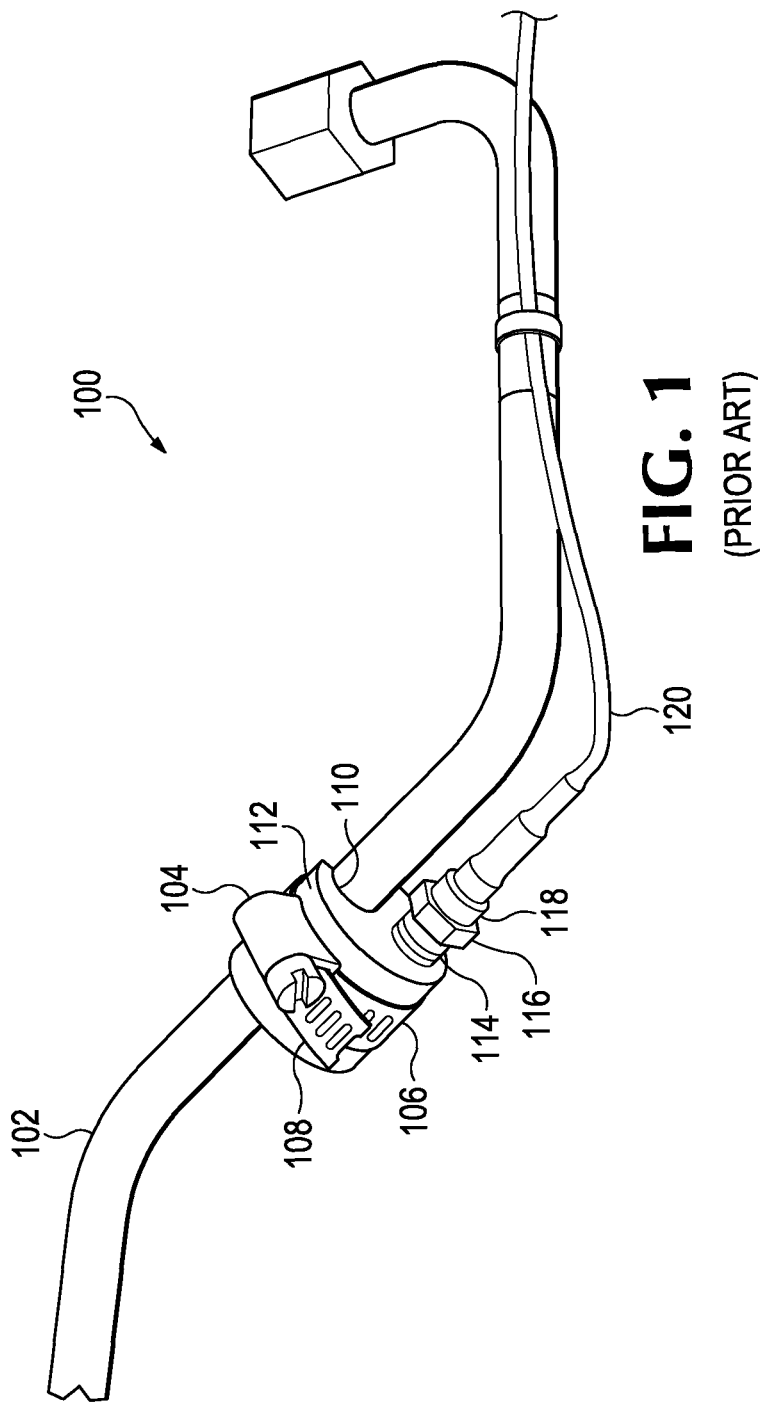

The present inventor discovered certain disadvantages of the temperature sensing assembly 100 shown in FIG. 1. Testing revealed that the assembly 100 produced measurements approximately 40° F. lower than direct oil contact measurements when exposed to typical operating conditions such as rapid airflow past the unit. The inventor observed that the adapter 112 contains significant thermal mass surrounding the sensor and positions the sensor tip such that the thermal energy must travel through several millimeters of aluminum and grease, with several alternate paths for heat to flow. The inventor further noticed that different adapters 112 are needed for each of the four most common sizes of cooling lines used in automotive applications. Cars and trucks typically use transmission cooling lines having 5/16" or 3/8" OD (outside diameter) dimensions. Larger vehicles, for example Dodge trucks with Cummins engines, may use 1/2" or 5/8" OD cooling lines.

Figure 2:
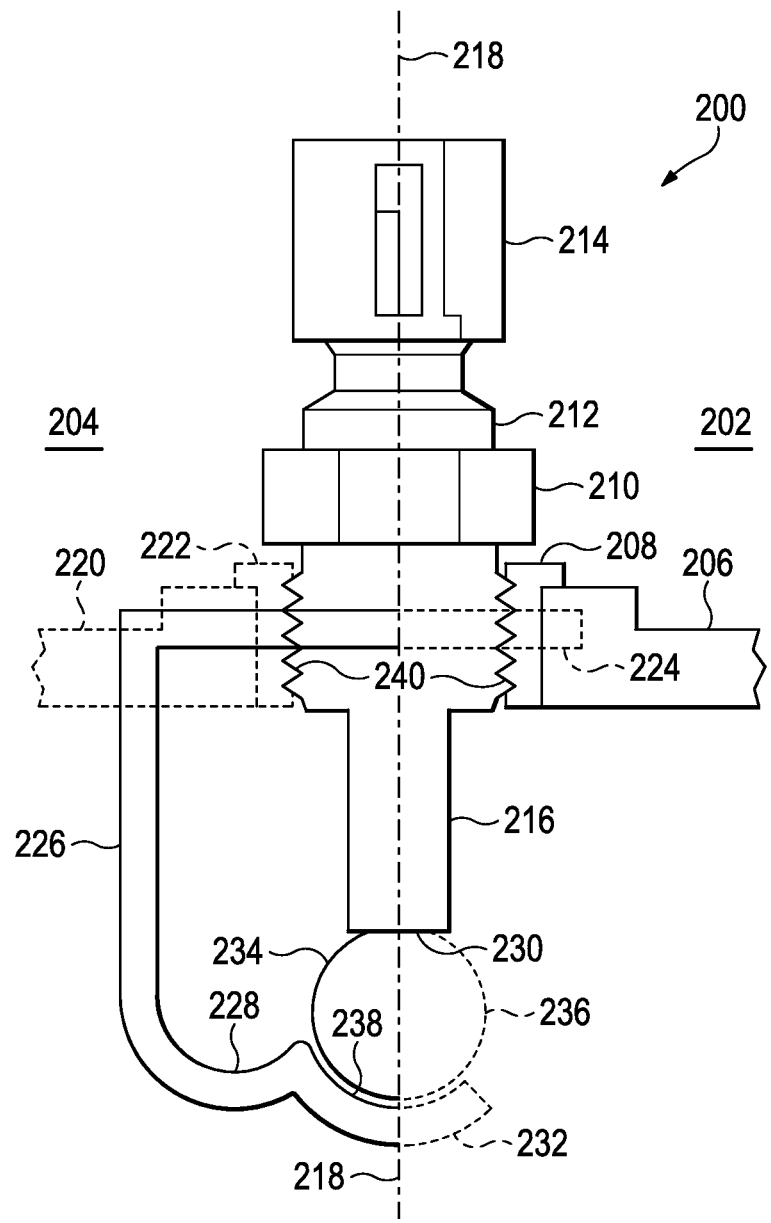

Typical transmission sender ports (i.e. ports accepting automotive transmission oil temperature sensors) use 1/8" NPT fittings. FIG. 2 illustrates a typical sender (transmission temperature sensor) 212. Centerline 218 divides FIG. 2 into a split view 200 illustrating two different temperature measuring arrangements. The right side 202 is a typical direct fluid contact installation, and the other half 204 is a direct cooling line contact installation. The sender 212 is a typical automotive transmission oil temperature sensor having a sensor tip end 230, a sensor probe/shaft 216, threads 240, hex nut 210, and connector 214. The sender 212 in FIG. 2 may be substantially or identically the same as the sender 112 in assembly 100 in FIG. 1.

In typical direct fluid contact installation (i.e. side 202 in FIG. 2) the sender 212 is threaded within a threaded or sleeved 208 sender port (either a test port in the transmission wall 206 (and symmetrically opposite (optional) sleeve 222 and transmission wall material 220) or a drilled hole in the pan). The shaft 216 then extends into the transmission for direct contact with the transmission oil therein (or extending into the pan for direct contact with the oil therein).

In preferred embodiments, the present inventor designed an extruded or formed clip 226 (shown on the left side 204, illustrating a direct cooling line contact temperature measuring arrangement) adapted to grip a section of cooling line 234 between the sender's tip end 230 and a preferably correspondingly radiused end 238, the radiused clip end 238 and an opposed portion of the clip 226 secured about the threaded portion 240 of the sender 212 being in compressive alignment along the centerline 218 running longitudinally along the length of the sender 212. The broken lined portions on the right side 202 (for example the upper end 224 of the clip through which the threaded 240 portion of the sender 212 passes, the outer end 232 of the radiused end 238 of the clip, and cooling line right half cross section 236) are included for completeness of the particular (right 202 or left 204 side) temperature measuring arrangements for sender 212.

In preferred embodiments, a conventional automotive temperature sensor such as sender 212 is usable in either a direct fluid contact measurement arrangement (as depicted in side 202 of FIG. 2) or a direct cooling line contact measurement arrangement (as depicted in side 204 of FIG. 2). In the former arrangement, the sender 212 is threadably installed in a test port or drilled hole in a conventional manner. In the latter arrangement, the sender 212 is held in perpendicular orientation to the cooling line 234 (as opposed to the substantially parallel orientation between sensor longitudinal centerline and the cooling line 102 in assembly 100 in FIG. 1) with its tip end 230 in direct contact with the side of the cooling line 234, where the cooling line 234 is shown in FIG. 2 as a cross section of a cooling line 102 as shown in FIG. 1.

Figure 3:
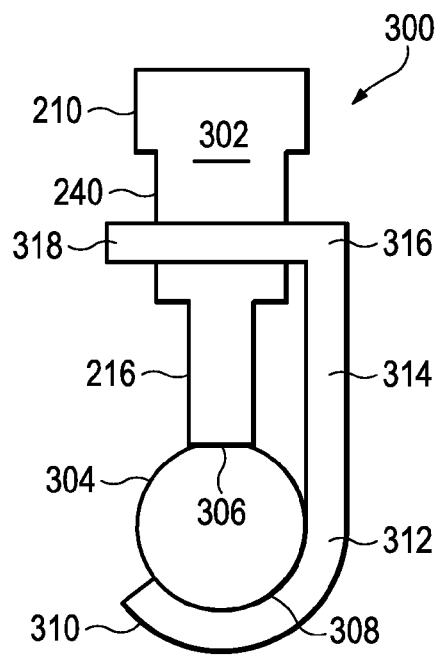
FIG. 3 is a direct cooling line contact temperature sensing arrangement using a sensor clip 314, according to a preferred embodiment.

The clip 226 is preferably made of a thermally conductive metal such as aluminum or copper, either formed or extruded, and approximately 1" wide (i.e. 1" along the direction into the page, or, expressed differently, 1" along a direction perpendicular to the centerline of the sensor 302 and in a direction substantially parallel to the length of cooling line captured within the radiused portion of the clip). The present inventor's initial concept 300 is shown in FIG. 3. The sensor (or sender) 302 is used to capture the tubing 304 within the device (i.e. clip) 314, with the very tip (tip end) 306 of the sensor 302 in direct contact with the (cooling line) tubing. As shown, the threaded portion 240 of the sensor 302 (just below the hex nut 210) extends through a (preferably threaded) hole shown between clip end 318 and right angle 316. The shaft portion 216 of the sensor 302 extends away from the threaded portion 240 and contacts the cooling line 304 at its tip end 306. The cooling line (tubing) 304 is captured between the sensor tip end 306 and a radiused portion 308 of the clip between an end 310 of the clip and a transition 312 where the clip transitions from a radius 308 corresponding to the exterior radius/OD of the cooling line 304 to a stretch of clip material connecting the radiused portion 308 to the right angle 316 and clip portion between the right angle 316 and end 318 secured about the threaded portion of the sensor 302.

In preferred embodiments the sensor 302 is threadably engaged with the portion of the clip between end 318 and right angle 316 as shown in FIG. 3. The threadable engagement may be by way of the pipe threads 240 of the sensor frictionally engaged with an appropriately sized hole in the clip material between the end 318 and right angle 316. The threadable engagement may be by way of one or more locking nuts threadably engaged with the sensor threads 240.

With threadable adjustments, installing the sensor 302 and clip 314 can be accomplished in seconds. For example, the clip 314 may be positioned so as to cradle/capture the cooling line 304 within the radiused portion 308 of the clip, then the sensor 302 may be fed through the other end of the clip 314 having the appropriately sized hole for receiving the threaded portion 240 of the sensor 302. With just a few turns of the sensor by hand, then with a wrench using the hex nut 210, the tip end 306 of the sensor may be tightened against the cooling line 304.

The present inventor constructed a prototype clip 314 made of copper and tested it for comparison with the assembly 100 shown in FIG. 1. The error for the clip 314 was at worst half that of the assembly 100, and the error was further reduced by another 50% with the addition of a simple insulating blanket around it so as to shield at least the shaft 216 portion of the sensor. Although not shown in the figures, embodiments preferably include such blanket or wrapping with cloth, insulation, and/or tape so as to shield the sensor from air flow. Further improvement may be obtained by using thermally conductive grease on the tip end 306 of the sensor 302. In one embodiment, the inventor determined fluid temperature measured by directly contacting the tip end of the sensor to the cooling line using clip 314 (or versions thereof) produced temperatures within 5 degrees F. of a sensor 302 in direct contact with the fluid (i.e. sensor 302 immersed in the fluid). However, the present inventor discovered sufficient performance without an insulator or thermally conductive grease.

Figure 4:
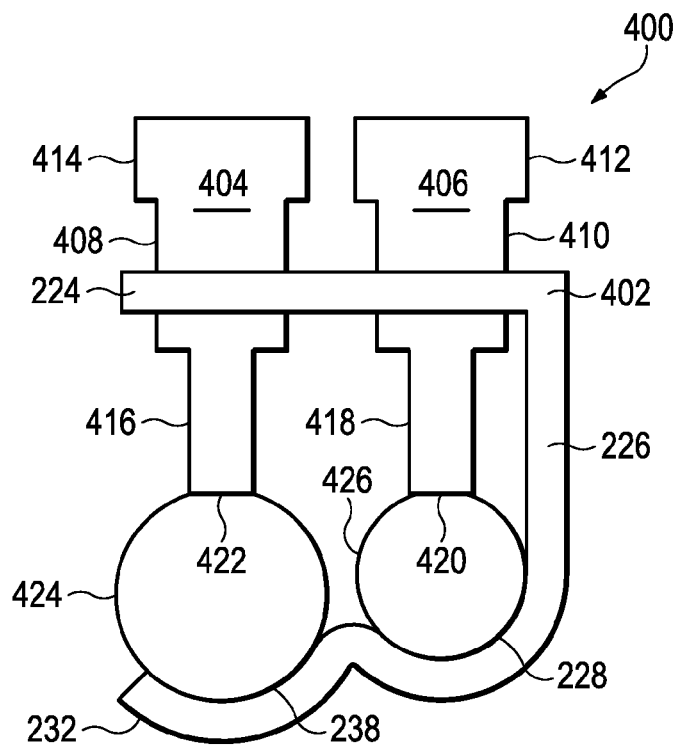
FIG. 4 illustrates direct cooling line contact temperature sensing arrangements using a sensor clip 226 configured for at least two different cooling line diameters, according to a preferred embodiment.

Turning now to FIG. 4, a direct cooling line contact temperature sensing arrangement 400 is illustrated that uses a sensor clip 226 configured for at least two different cooling line diameters. Preferably one or the other of sensors 404 or 406 are installed to capture one or the other of cooling lines 424 or 426 using clip 226. For a smaller diameter cooling line 426, the radius 228 region of the clip 226 is used. For a larger diameter cooling line 424, the radius 238 region of the clip 226 is used. Sensors 404 and 406 may be identical with one another or different, or either or both may be the same as any of the sensors 302, 212, or 118. Sensor 404 has hex nut 414 (or hex surface) that provides aid in tightening the sensor using threads 408 through a hole in the top flange of the clip 226 that extends between clip end 224 and right angle 402 where the clip bends downward into a direction in parallel with the longitudinal axis (i.e. centerline) of the sensor. Then, the clip bends about a first (smaller) radius 228, and then about a second (larger) radius 238 before ending at clip end 232. The cooling line having cross section 424 is captured between radius 238 and the sensor tip end 422 of shaft 416. In similar fashion the cooling line having cross section 426 is captured between radius 228 and sensor tip end 420, where the sensor tip end 420 is the farthest extending point of sensor shaft 418 held fast against the cooling line 426 via engagement of sensor threads 410 about a hole in the top clip portion extending between clip end 224 and right angle 402, the hole being aligned along the centerline of sensor 406 and the correspondingly opposite radius 228. Just as with the other sensor/sensor location, sensor 406 may be threadably tightened down upon the cooling line 426 using hex nut 412.

Although the relative cooling line cross sectional sizes are as shown in FIG. 4, they may be switched in relation to one another, in less preferred embodiments. In more preferred embodiments, the smaller diameter cooling line may be captured within an inner most position, closest to the clip portion extending between radius 228 and right angle 402.

Figure 5:
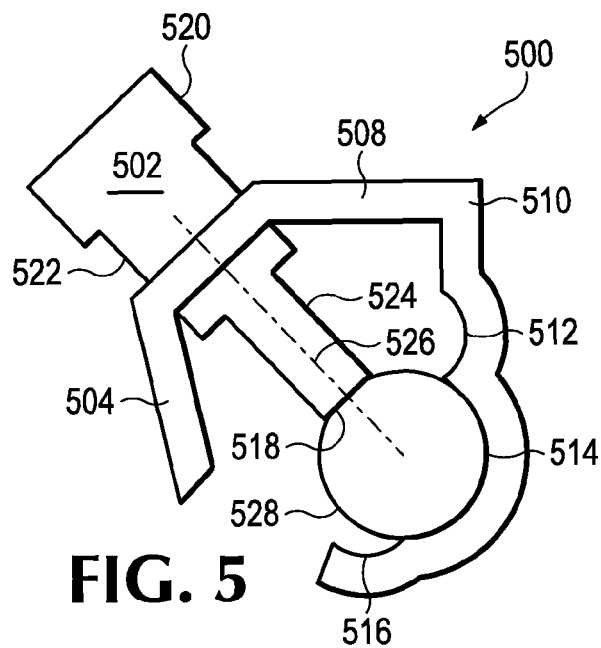
FIG. 5 is a direct cooling line contact temperature sensing arrangement 500 using a multiple cooling line diameter accommodating sensor clip and a large diameter cooling line 528, according to a preferred embodiment.
Figure 6:
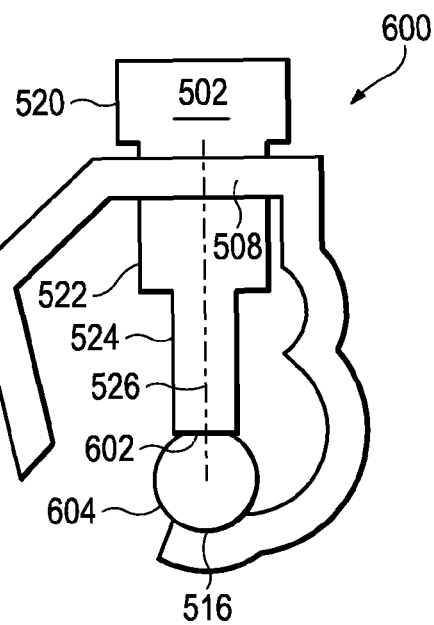
FIG. 6 illustrates a second arrangement 600 using the sensor clip in FIG. 5 and a medium diameter cooling line 604, according to a preferred embodiment.
Figure 7:
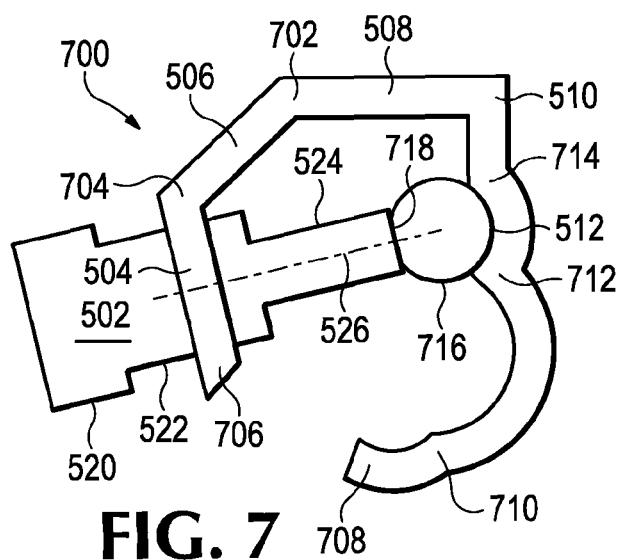
FIG. 7 illustrates a third arrangement 700 using the sensor clip in FIG. 5 and a small diameter cooling line 716, according to a preferred embodiment.

FIGS. 5-7 are direct cooling line contact temperature sensing arrangements using a multiple cooling line diameter accommodating sensor clip. The clip design is the same in each figure, and each figure simply illustrates one of three different sensor and cooling line positions. FIG. 5 illustrates a first arrangement 500 with sensor 502 capturing a large diameter cooling line 528, according to a preferred embodiment. FIG. 6 illustrates a second arrangement 600 using the sensor clip in FIG. 5 and a medium diameter cooling line 604, according to a preferred embodiment. Finally, FIG. 7 illustrates a third arrangement 700 using the sensor clip in FIG. 5 and a small diameter cooling line 716, according to a preferred embodiment.

The clip may be defined by its sensor engaging portions, transitions, and radius portions that are in alignment with respective sensor engaging portions. In FIG. 5, for example, clip portion 506 is shown threadably engaging threads 522 of sensor 502. The centerline 526 is shown in alignment with the clip portion 506 and opposing large radius 514. The large radius 514 is sized to receive and capture cooling line 528 (or cross section 528). The tip end 518 is tightened down against the cross section 528 by using hex nut 520 (or hex surface) to extend shaft 524 toward the cooling line surface. As the tip end 518 contacts and increasingly presses against the surface of the cooling line and radius 514, the clip bends so as to increase the compressive force/clamping force for capturing and holding the cooling line cross section 528.

Clip portion 504 is aligned opposite radius 512, and clip portion 508 is aligned opposite radius 516. Tracing along the clip in a clockwise direction, clip portion 504 transitions (in an obtuse angle) to a differently angled portion 506. Clip portion 506 transitions (in an obtuse angle) to a differently angled clip portion 508. The clip then transitions at a right angle 510, extending downward to incorporate a small radius 512, then a large radius 514, and finally a medium radius 516. The specific angles and orientations may be different. However, the alignments between sensor engaging portions of the clip and correspondingly opposite radius portions are maintained in preferred embodiments.

FIG. 6 illustrates the sensor 502 positioned so as to capture a medium diameter cooling line 604 between tip end 602 and radius 516. FIG. 7 illustrates the sensor 502 positioned so as to capture a small diameter cooling line 716 (of which there are at least two differently sized "small" diameter cooling lines) between tip end 718 and radius 512.

Tracing along this edge view (in a direction into the page, or in a direction parallel with the cooling line portion captured within the clip) in a counterclockwise direction, clip end 708 transitions from one radius to another at 710 and then again at 712 and then from a radius to an extension to right angle 510. From the right angle 510, the clip extends counterclockwise across portion 508, transitioning at 702 to portion 506, transitioning at 704 to portion 504, and finally terminating at clip end 706. Transitions 702 and 704 are each obtuse angles.

Material thickness of the clip in this edge view (in FIGS. 5-7) is of less importance than the clip's sensor engaging capabilities (across the portions 504, 506, and 508) and the clip's spring characteristics (for maintaining clamping forces between sensor tip end and the corresponding clip radius, within which a particular cooling line is captured). Also of less importance is the particular material used. The material need not be of any particular thermal quality, in preferred embodiments, since the clip functions to hold the sensor tip end in direct contact with the cooling line/tubing. The head radiated from the transmission oil within the cooling line and through the cooling line material is what the temperature sensor preferably accurately measures.

In one embodiment, radius 514 is adapted to capture ⅝" OD cooling line; radius 516 is adapted to capture ½" OD cooling line; and radius 512 is adapted to capture both ⅜" and ⁵⁄₁₆" OD cooling lines.

The terms and expressions which have been employed in the forgoing specification are used therein as terms of description and not of limitation, and there is no intention in the use of such terms and expressions of excluding equivalence of the features shown and described or portions thereof, it being recognized that the scope of the invention is defined and limited only by the claims which follow.

I claim:

1. A method of measuring temperature of a fluid using a direct fluid contact type temperature sensor, comprising:
   (a) providing a clip having a sensor engaging portion and a radiused clip portion opposite thereof, the sensor engaging portion capable of securely capturing threaded mounting features of said direct fluid contact type temperature sensor, said engaging portion having a material thickness and a material width such that said thickness is less than said width, said thickness is perpendicular to a longitudinal axis of the fluid line to be captured by said clip throughout all of said engaging portion, said longitudinal axis of said fluid line being perpendicular to a cross sectional area of said fluid line, and said width is parallel to said longitudinal axis of said fluid line throughout all of said engaging portion;
   (b) threadably engaging said direct fluid contact type temperature sensor in said sensor engaging portion of said clip;
   (c) capturing a fluid line between a radius of a said radiused clip portion, said radiused clip portion extending longitudinally in parallel with a corresponding portion of said fluid line, and a tip end of said direct fluid contact type temperature sensor such that said tip is contacting said fluid line; and (d) measuring a temperature of said fluid line proximate to said tip end of said sensor with said direct fluid contact type temperature sensor without said sensor directly contacting said fluid.

2. The method of claim 1 wherein said measuring is free from disconnecting portions of said fluid line.

3. The method of claim 1 wherein a centerline of said sensor is perpendicular to a longitudinal axis of said corresponding portion of said fluid line.

4. The method of claim 1 wherein said capturing is free from use of externally applied hose clamps, screws, or other fastening devices.

5. The method of claim 1 wherein said fluid line comprises a cooling line.

6. The method of claim 1 wherein said radius is any one of four different values so as to allow for capture of any one of four different sizes of fluid line.

7. The method of claim 6 wherein said difference sizes include 5/16", 3/8", 1/2", and 5/8".

8. A device for rapidly installing a direct fluid contact type temperature sensor onto a fluid line for measuring a temperature of said fluid without requiring cutting or disconnection of said fluid line, the device comprising:

(a) a clip adapted to capture a fluid line between a radius of a clip portion, said clip portion extending longitudinally in parallel with a corresponding portion of said fluid line, and a tip end of said sensor;

(b) a sensor engaging portion of said clip, said sensor engaging portion capable of securely receiving a threaded portion of said sensor so as to adjustably position said tip end of said sensor for contact with said cooling line and exertion of compressive forces between said tip end of said sensor and said radius of said clip portion of said clip, said engaging portion having a material thickness and a material width such that said thickness is less than said width, said thickness is perpendicular to a longitudinal axis of the fluid line to be captured by said clip throughout all of said engaging portion, said longitudinal axis of said fluid line being perpendicular to a cross sectional area of said fluid line, and said width is parallel to said longitudinal axis of said fluid line throughout all of said engaging portion; and (c) a structural extension portion of said clip extending between said sensor engaging portion of said clip and said radius of said clip portion of said clip.

9. The device of claim 8 wherein a centerline of said sensor is perpendicular to a longitudinal axis of said corresponding portion of said fluid line.

10. The device of claim 8 wherein said device is free from externally applied hose clamps, screws, or other fastening devices.

11. The device of claim 8 wherein said fluid line comprises a cooling line.

12. The device of claim 8 wherein said radius is any one of four different values so as to allow for capture of any one of four different sizes of fluid line.

13. The device of claim 12 wherein said difference sizes include 5/16", 3/8", 1/2", and 5/8".

* * * * *